J. TESSIER.
MOTION PICTURE FILM.
APPLICATION FILED FEB. 6, 1915.
1,159,130.  Patented Nov. 2, 1915.
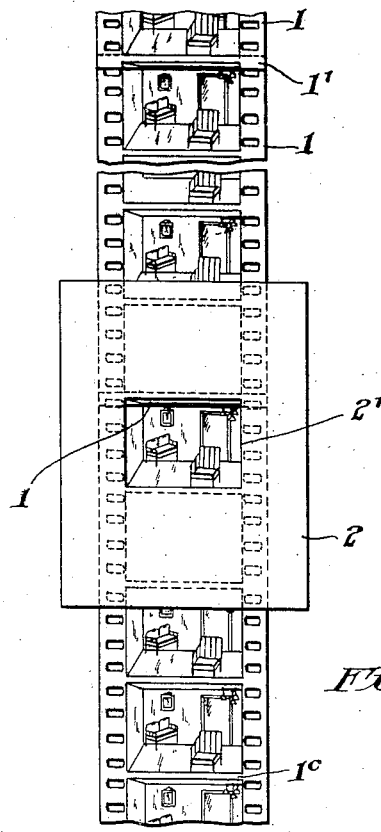
Fig. 1.
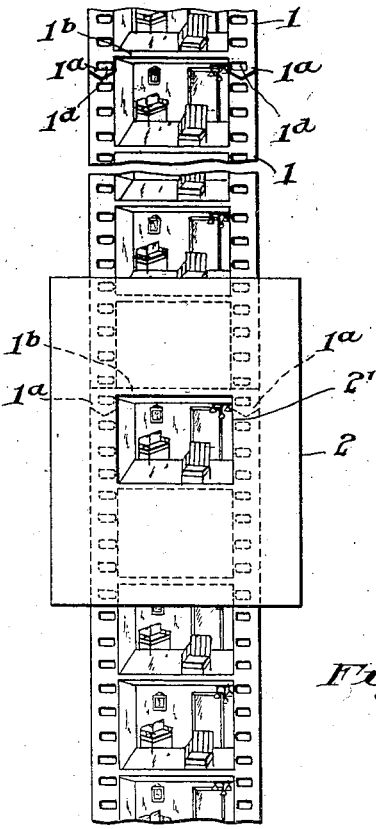
Fig. 5.
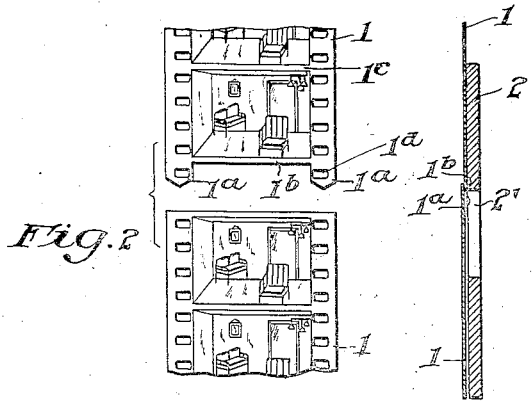
Fig. 2.   Fig. 4.   Fig. 3.
Witnesses
Inventor
Julien Tessier,
By
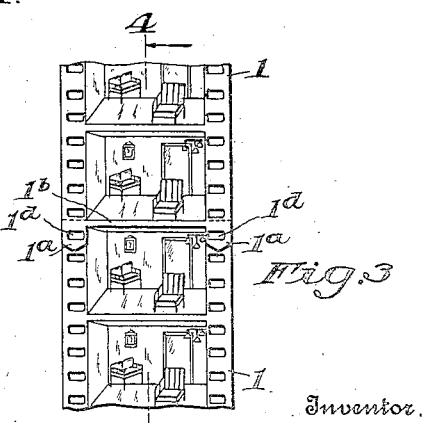
Attorney

UNITED STATES PATENT OFFICE.

JULIEN TESSIER, OF PHILADELPHIA, PENNSYLVANIA, ASSIGNOR TO LUBIN MANUFACTURING COMPANY, OF PHILADELPHIA, PENNSYLVANIA, A CORPORATION OF PENNSYLVANIA.

MOTION-PICTURE FILM.

1,159,130. Specification of Letters Patent. Patented Nov. 2, 1915.

Application filed February 6, 1915. Serial No. 6,537.

*To all whom it may concern:*

Be it known that I, JULIEN TESSIER, a citizen of France, residing in the city of Philadelphia, county of Philadelphia, and State of Pennsylvania, have invented certain Improvements in Motion-Picture Films, of which the following is a specification.

In joining sections that make up the negatives of motion picture films, it has been customary to effect the unions by means of joints which are required to have so much material scraped and to have so much lap glued in order to provide the necessary strength that in printing negatives part of the joint projects into the light aperture of the machine and causes a streak to be formed across the positive, and in projecting the positive on the screen this streak is reproduced in the picture.

It is the object of my invention to provide a joint of ample strength and of such character that it will not project into the light aperture so as to intercept or reflect light used in printing, and which will avoid the production of positives casting streaks, or irregularities between the images, upon the screen.

The characteristic features of my improvements are disclosed in the following description and the accompanying drawings in illustration thereof.

In the drawings, Figure 1 is a view of a light aperture combined with a broken film section of usual character, in combination with part of a printing or projecting machine containing the light aperture; Fig. 2 is a view of detached sections of a film adapted to be joined in accordance with my invention; Fig. 3 is a view of the parts shown in Fig. 2 after they have been joined; Fig. 4 is a sectional view taken on the line 4—4 of Fig. 3; and Fig. 5 is a view of a broken film section having parts joined in accordance with my invention, in combination with a light aperture.

As shown in Fig. 1, it has been customary to join negative sections 1 by joints comprising laps 1' which are required for strength to be of such width that they cover at times parts of the pictures, and when the pictures adjacent to the joints are exposed through the device 2 containing the light aperture 2' such laps extend into the aperture, thus intercepting and deflecting light so as to cause streaks or irregularities to be formed in the positive, which appear in pictures projected upon the screen.

As shown in Figs. 2 to 5 inclusive, I provide the sections 1, which are to be joined, with side or edge laps 1ª projecting well beyond the division between adjacent pictures of the joined sections, which have the narrow intermediate laps 1ᵇ between such adjacent pictures within the side laps, the intermediate laps having approximately the width of the division spaces 1ᶜ common to adjacent pictures of the respective sections.

The laps 1ª are exterior to the sight of the pictures, and, with the laps 1ᵇ and division spaces 1ᶜ, are covered by the plate 2 containing the aperture 2' so that the sight of the film exposed for the passage of the light rays is of uniform thickness and exposes no edges or sections normally obstructing or deflecting the light.

By my improvements, a stronger joint is made because there is no occasion for limiting the lap of the parts 1ª and since such parts are provided with perforations 1ᵈ registering with like perforations in the film edges to which they are joined, usual stresses tending to separate the film sections at the joints are applied to both sections and such tendency is eliminated.

It will be understood that my improvements are to be used with both negatives and positives, and that modifications may be made, as by duplication or having laps on each film section, without departing from the spirit of my invention.

Having described my invention, I claim:

1. A film having sections joined by a narrow lap between adjacent pictures and by edge laps projecting beyond the lap between the pictures and exterior thereto.

2. A film comprising sections having a joint formed by perforated projections on one section which register with perforations of the adjacent section, said projections extending beyond an intermediate edge of the film section from which they project.

3. A film comprising connected sections having perforated edges, one of said sections having an edge projection lapping an edge of the adjacent section and containing a perforation registering with a perforation of said adjacent section.

4. A film comprising sections joined by means of a lap between adjacent pictures not substantially greater than the common space between adjacent pictures, and an edge lap extending beyond said lap between the pictures.

5. A film comprising sections joined by means of a lap between adjacent pictures not substantially greater than the common space between adjacent pictures, and edge laps extending beyond said lap between the pictures, whereby the film is adapted for exposing pictures thereon through the gate without exposing the joint.

In testimony whereof, I have hereunto set my name this sixteenth day of January, 1915, in the presence of the subscribing witnesses.

J. TESSIER.

Witnesses:
    Jos. G. Denny, Jr.,
    C. N. Butler.